Fig. 1.

Feb. 10, 1925.
G. T. RANDOL
1,526,234

GEAR SHIFTING MECHANISM

Filed July 21, 1922     8 Sheets-Sheet 6

INVENTOR
G. T. Randol,
BY
ATTORNEY

Patented Feb. 10, 1925.

1,526,234

UNITED STATES PATENT OFFICE.

GLENN T. RANDOL, OF MARMADUKE, ARKANSAS, ASSIGNOR OF 50 PER CENT TO SOL S. STEINBERG, OF PARAGOULD, ARKANSAS.

GEAR-SHIFTING MECHANISM.

Application filed July 21, 1922. Serial No. 576,558.

*To all whom it may concern:*

Be it known that I, GLENN T. RANDOL, a citizen of the United States, and a resident of Marmaduke, in the county of Greene and State of Arkansas, have invented certain new and useful Improvements in Gear-Shifting Mechanism, of which the following is a specification.

This invention relates to improvements in gear shifting mechanism.

The present mechanism is primarily adapted for use in connection with that form of a motor driven vehicle provided with a so-called unit power plant in which the selective gear transmission mechanism is located adjacent the clutch connecting the ends of the shaft with the main drive shaft.

The present invention more particularly relates to improvements over my Patent No. 1,419,518 issued June 13, 1922 and has for its primary object to provide a gear shifting mechanism wherein there is embodied selective setting mechanism operable from the steering column of the associated vehicle and capable of being operated while the clutch of the vehicle is closed or opened or in any other intermediate position without resulting in injury to any of the parts thereof.

It is also an object of the invention that the parts or elements constituting the mechanism be simple and not subject to getting out of working order or adjustment.

It is a further and important object of the invention that the mechanism is not over-sensitive in operation for obtaining the different positions of the associated transmission gears.

A still further object of the invention is that the gear shifting mechanism be arranged so that the same may be lubricated from the oil within the associated gear casing through splashing of said oil with the movement of transmission gears therein.

It is a still further object of the invention that the gear shifting mechanism be adapted to be applied to any type of vehicle in which selective shifting gear transmission is employed.

It is a further and important object of this invention to provide a gear shifting mechanism which eliminates the use of locking devices to hold the shifter rods in the several active and inactive positions therefore minimizing the effort on the part of the driver of car to operate the shift.

A still further object of this invention is to provide a gear shifting mechanism that will at all times allow the gears of the transmission to be under the direct control of the operator of the car whether neutralizing or meshing the same which tends towards a quieter operation of the gears of transmission and carries out the old principle of "feeling the gears in".

A still further object of the invention is to provide a gear shifting mechanism adapted to be operated by disengaging and engaging movements of a power clutch of a motor vehicle and which will allow of the clutch to be released prior to the operation of the shifter and the last portion of the release throw of clutch pedal to be utilized to neutralize any gear that may be active in the associated gear transmission and the same portion of the return or engagement of the clutch to be utilized to shift the gear selected.

Other objects and objects relating to details of construction, combination and arrangement of parts will hereinafter appear in the detail description to follow.

The invention is illustrated by way of example in the accompanying drawings, in which—

Like reference numerals refer to similar parts in each of the several views.

Referring to the drawings more particularly, the gear shifting mechanism may be housed in a casing which may comprise a bottom plate 10 formed with a central opening 11. With this plate there is formed a box B which occurs directly over the recess or opening 11 in the plate 10 and which comprises the two side walls 12 and 13 and the forward and rear walls 14 and 15, respectively. For this box there is provided a cover plate 16 which may be secured thereto by bolts 17. The plate 10 may be secured to the selective gear transmission casing C by the means of machine screws or bolts 18 and should be arranged so that the box B will be disposed directly over the inlet to the transmission gear casing C. The forward end of the plate 10 is formed with a transversely extending enlargement 19' which occurs upon the upper surface of the plate and immediately forward to the box B. At the rear of the box B the plate 10 is provided with a plurality of grooves 19 which are four in number. A plate 20 forms a closure for the rear end of the grooves and a cover 21 serves as a top closure for the grooves 19. The cover 21 may be secured in position by machine screws 22. The enlargement 19 before referred to is provided with four bores 23, one for each of the grooves 19 and in alinement therewith.

The present gear shifting mechanism is designed for a gear transmission from which four different speeds may be obtained, that is, intermediate, high, low and reverse, and a shifter rod is provided in the mechanism for obtaining each of these speeds. These shifter rods are generally indicated by the reference characters $R^1$, $R^2$, $R^3$ and $R^4$ and shown to advantage in Figure 6 of the drawings. Each rod consists in a central square portion 24, a forward end portion 25 which is adapted to slide within the bore 23, and a rear end rack portion 26 which is adapted to slide in the associated groove 19. The rear end portion 26 has secured to its lower face a rectangular shaped plate 27 which is also adapted to slide within the groove 19 and to hold the rear end of the associated bar in proper alinement. Two of the gear shifting rods $R^4$ and $R^2$ have depending from their lower sides an arm 28 which terminates in a yoke Y and this yoke is in proper engagement with the transmission gear which the associated rod controls. In the present arrangement upon rearward movement of rod $R^4$ a predetermined degree high speed may be obtained and upon the same movement of rod $R^3$ intermediate speed is obtained. Upon rear movement of rod $R^2$ low speed is obtained and upon rear movement of rod $R^1$ reverse connection of the gears and gear casing is obtained. Between the rods $R^3$ and $R^4$ and between the rods $R^1$ and $R^2$ there is positioned in each instance a pinion 29 which is supported by a suitable stub shaft 30 and which is adapted to mesh with the rack bar portion 26 of the associated rods. Upon rear movement of rod $R^1$ the rod $R^2$ will simultaneously move forward and this same operation is true with respect to rods $R^3$ and $R^4$.

Figure 6:
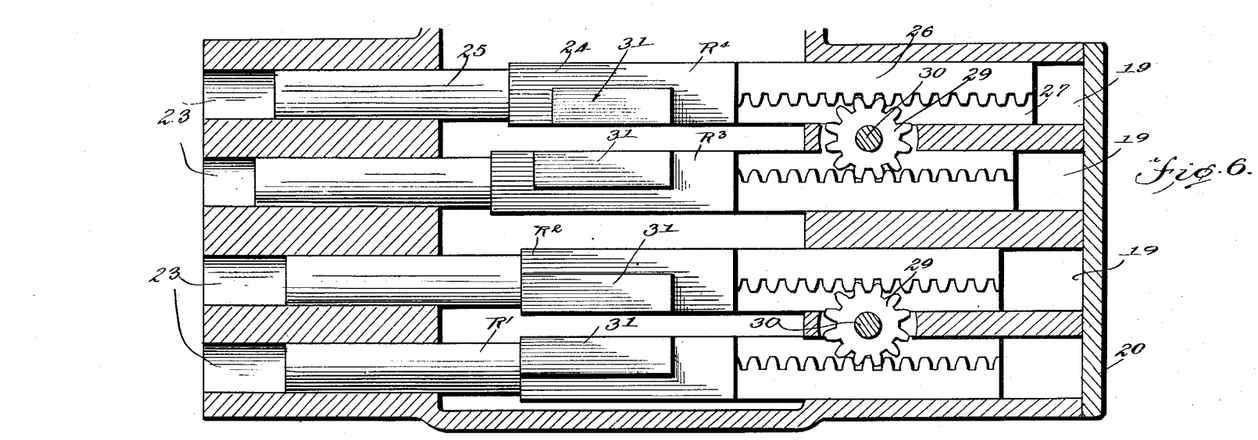
Figure 6 is a horizontal sectional view taken immediately above the shifter rods of the gear shifting mechanism.

Each of the rods $R^1$ to $R^4$ inclusive has its square or intermediate portion 24 formed with a protrusion 31, said protrusion in each instance occurring upon the upper face of the square portion 24 and being rectangular in shape. It will be noted that the forward end of the protrusion 31 of the rod $R^4$ terminates at the rear of the same end of the protrusion 31 of the remaining rod and the same end of rod 3 is at the rear of rods $R^1$ and $R^2$. The rear ends of each of the protrusions 31 are in alinement, that is when the rods are in neutral position, as best shown in Figure 6 of the drawings; and the front ends are not in alinement especially protrusions on shifter rods $R^2$ and $R^3$ as high and intermediate gears are obtained with shorter movements than low and reverse. This construction allows of a constant stroke of selector arms for all four gears irrespective of the length of movement of the shifter rods necessary to mesh the gears. This gives the operating arm 62 a fixed stroke.

Figure 5:
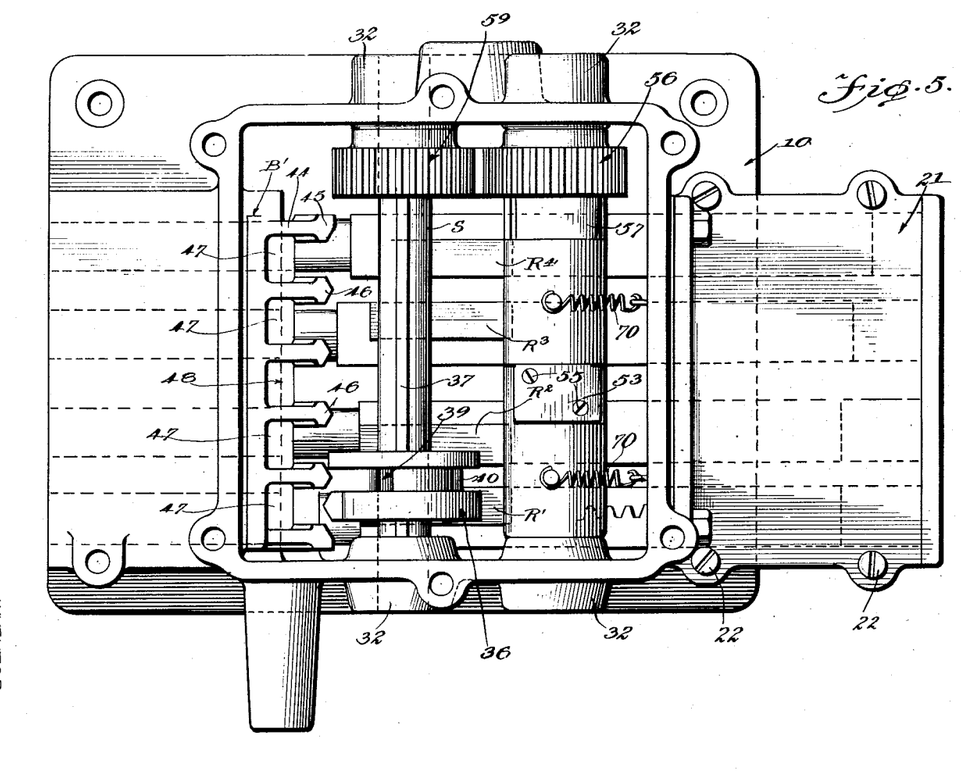
Figure 5 is a top plan view of the gear shifting mechanism with the cover of the casing removed.

Adjacent the upper end of the box B there is journaled two transversely extending shafts S and S'. The box B may be formed with suitable bearings 32 for journalling the shafts S and S'. Upon the shafts S there is movably mounted the selector arm 34, said arm terminating in a rounded end 35 adapted to engage the lugs or protrusions 31 on the different gear shifting rods, and at its upper end being integrally formed with a hub or collar 36 which is provided upon its inner periphery with grooves 37 adapted for receiving ribs 38 upon the shaft S whereby to spline the same thereon. The collar 36 is also formed with an annular groove 39 (Figure 5) in which there is disposed a yoke 40, said yoke being connected to the free ends of a shifter rod 41 which extends through the side wall of the box B. The manner in which the rod 41 is operated will later be described.

The collar or hub 36 has also formed therewith a detent or lug 42 which has its edges beveled as at 43. Upon the forward wall 14 of the box there is mounted a guide bar generally indicated by the reference numeral B', said bar having projecting rearwardly therefrom a plurality of lugs 44 each of which terminates in a head 45 having its vertical edges beveled as at 46. These lugs are spaced so as to provide a plurality of reception pockets or recesses 47 for the detent 42 of the selector hub 36. In other words the lugs 44 provide a recess 47 for each of the shifter rods $R^1$ to $R^4$, inclusive, and also provide an intermediate recess or pocket 48 for the neutral position of the selector arm 34, that is to say when the lug 42 is disposed in the recess 48 the selector arm 34 is in its neutral position.

Upon the shaft S' there is turnably mounted the two neutralizing arms N and N', each arm terminating at its lower and free end in a rounded head portion 49 and at its upper end in a hub 50. The hub 50 of the arm N' is recessed at its one end as at 51 and the hub 50 of the arm N is similarly recessed at its similar end as at 52. Intermediate the hubs 50 of the arms N and N' there is secured to the shaft a block 53, said block being of a less width than the recess 51 and normally forming a gap 54 upon each side thereof as shown to advantage in Figure 9. The block 53 may be secured to the shaft S' by a set screw as at 55 (Figure 9).

Adjacent the outer side of the hub 52 for the neutralizing arm N there is secured to the shaft S' a gear 56, said gear having a hub extension 57 which is disposed in the recess 52 of the hub 50 for the neutralizing member N. This extension 57 is of less width than the recess 52 and adapted to form a gap 58 upon each side thereof similar to the gaps 54 formed between the block 53 and the confronting walls of the recess 51.

The shaft S has also secured thereto a gear 59. In the side wall of the box B associated with the gears 56 and 59 there is journaled a stub shaft 60 which supports a segmental gear 61 on its inner end, said segmental gear 61 being in constant mesh with the gears 56 and 59. Upon the outer end of the stub shaft 60 there is secured a sleeve or hub 60' which has extending radially therefrom an arm 62. The lower end of the arm carries a roller 63'.

Figure 1:
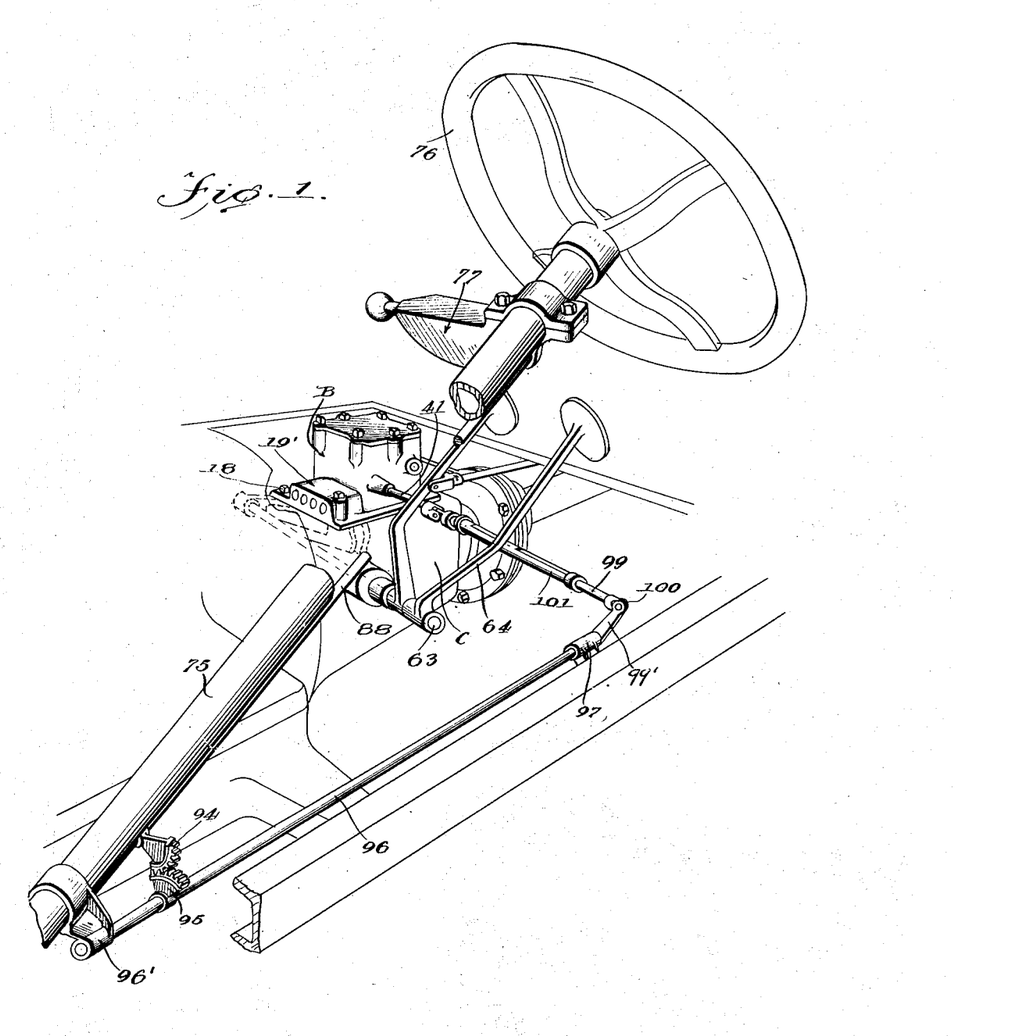
Figure 1 is a detailed perspective view showing the invention applied.
Figures 7, 8, 9, 10:
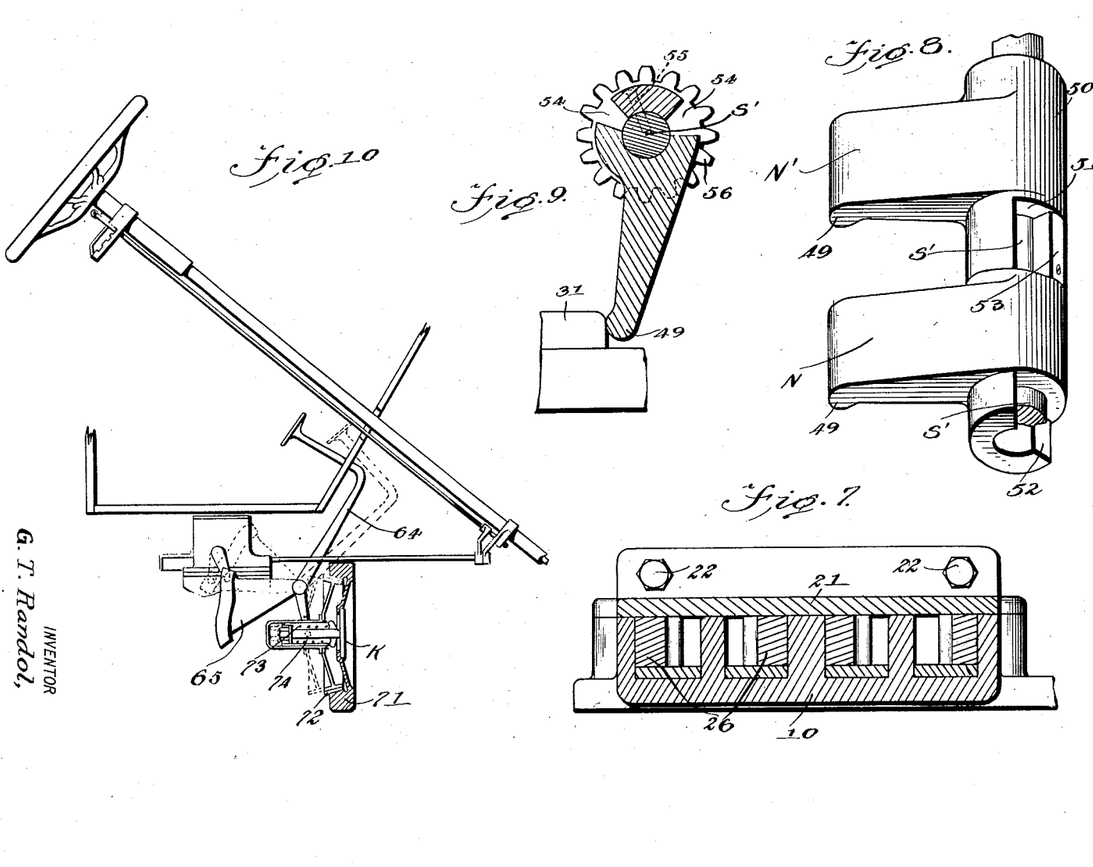
Figure 7 is a transverse vertical sectional view taken adjacent the rear end of the housing for the gear shifting mechanism.
Figure 8 is a detailed perspective view illustrating the assembling and mounting of the neutralizing members for the gear shifting mechanism.
Figure 9 is a vertical sectional view taken through one of the neutralizing members and showing the manner in which it engages an associated gear shifting rod.
Figure 10 is a view in side elevation and partly in section illustrating the manner in which the spring controlled clutch of the vehicle may operate the gear shifting mechanism.

Referring to Figures 1 and 10, 63 indicates a shaft which is adapted for operating the clutch K through the foot pedal 64. Upon the one end of the shaft 63 there is secured a radially extending plate member 65 which is in the shape of a sector and having its outer end formed with a peripheral enlargement 66 upon the inner side of which is formed a groove 67, said groove being of equal radii with respect to the shaft 63 its entire length with the exception of its end portion 68 which is of a greater radius than the remainder of said groove. The roller 63 is adapted to move in the groove 67 and adapted to shift the arm 62 of the segmental gear 61 upon the member 65 being moved to shift the roller 63 into or from the portion 68 of the groove 67 in an obvious manner.

Each of the hubs 50 of the neutralizing arms N and N' are formed with a boss 69 and between each boss 69 and the rear wall 15 of the box B there is interposed a coil spring 70. The purpose of the coil spring 70 in each instance is to maintain the free ends of the neutralizing arms N and N' in engagement with the lugs or protrusions 31 or the shifter rods R' to $R^4$, inclusive, and at all times urge these the shifter rods into neutral position.

Each of the neutralizing arms N' and N is forced rearwardly by action of the selector arm 34 against the forward ends of the protrusions 31 of the shifter rods R', $R^2$, $R^3$, $R^4$ against which protrusions the free ends of the neutralizing arms press holding these protrusions in alinement when the gears of the transmission are in neutral position, and these same neutralizing arms N', and N are forced forwardly by action of the block 53 and extension 57 respectively against the recessed hub cut in each which movement forces any one shifter rod that may happen to be active back into its neutral position. The small springs 70 are always tensioned whether the neutralizing members are active against one of the protrusions or not.

Referring to Figure 10 the clutch K is of the usual friction type comprising the drum 71 and the friction band wheel 72. The drum 71 has a pin or bolt extending therefrom as at 73 and upon which the member 72 is slidable. The member 72 is urged toward the drum 71 for engagement therewith by a spring 74. The construction of this type of clutch is well known by those skilled in the art. The lower end of the foot pedal 64 is connected for shifting the member 72 in the usual manner. In this figure the position which the foot pedal 64 assumes when disconnecting the clutch K is shown in dotted lines. Also the position which the member 65 assumes when the clutch is disconnected and the foot pedal fully depressed is shown in dotted lines. As before stated the member 65 carried by the shaft 63 serves for operating the arm 62 and said arm in turn operating the shafts S and S'.

Figures 11, 12, 13:
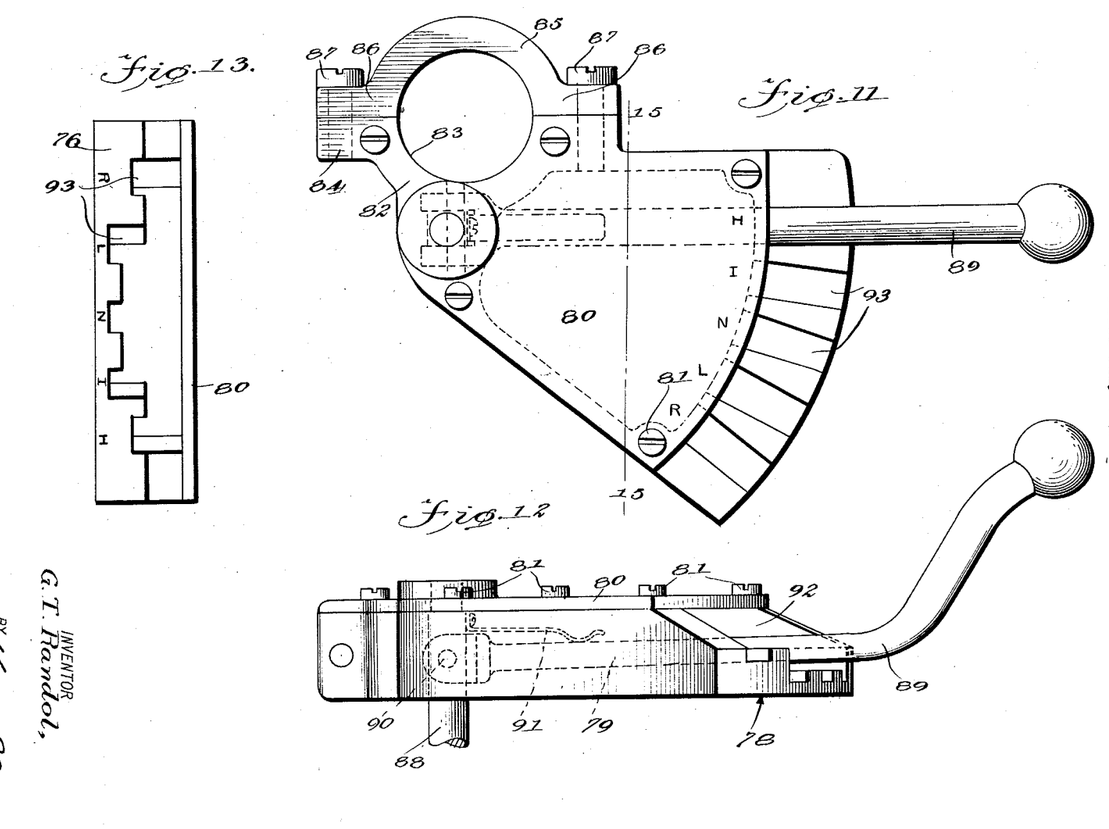
Figure 11 is a top plan view of the control lever and associated parts carried on the steering column of the vehicle to which the invention is applied.
Figure 12 is a view in side elevation of the same.
Figure 13 is a detail view in side elevation illustrating the notched member for holding the control member in a different position.

Referring specifically to Figure 1 at 75 is indicated the usual steering column of a motor vehicle and at 76 the steering wheel associated therein. At a point beneath the steering wheel 76 there is mounted upon the steering column 75 a casing generally indicated by the reference numeral 77, said casing extending radially from the steering column 75 and as best shown in Figures 11 to 13 inclusive comprises a bottom wall 78 which is substantially in the shape of a sector and which is formed about its edge with an upwardly extending side wall 79. Upon the upper edge of the side wall 79 there is positioned a cover 80 which is held in position by machine screws 81. The one end of the casing terminates in a solid portion 82 which is formed with a semi-circular recess 83 and lug extensions 84. A semi-circular collar 85 is provided terminating at each end in an apertured ear 86 and the collar 85 together with the portion 82 of the casing 77 are adapted to encircle the steering column 75. Suitable machine screws 87 are employed for clamping these members to the steering column.

From the steering column 75 there is suitably journaled a rod 88, said rod extending substantially the entire length of the steering column and at a point adjacent its upper end there is connected the one end of the hand lever 89. The hand lever 89 is bifurcated at its inner end and connected to the rod 88 by the means of a pin 90 whereby to permit upward swinging movement of the hand lever. Also a spring 91 is connected at its one end to the rod 88 and adapted to press downwardly upon the hand lever 89. The side wall 79 of the casing 77 is provided with an elongated recess 92 and the edge so formed is provided with a plurality of horizontally disposed slots 93, each slot being adapted to receive the hand lever 89. The slots 93 are preferably five in number and correspond to the positions which the hand lever 89 must assume for securing the high, intermediate, neutral, low and reverse of the gears in the associated transmission gear casing. The different slots 93 are indicated in their respective order by the reference characters H, I, L, N and R, meaning that when the hand lever 89 is disposed in the slot 93 marked H that high speed of the transmission gears is obtained, etc.

Figure 14:
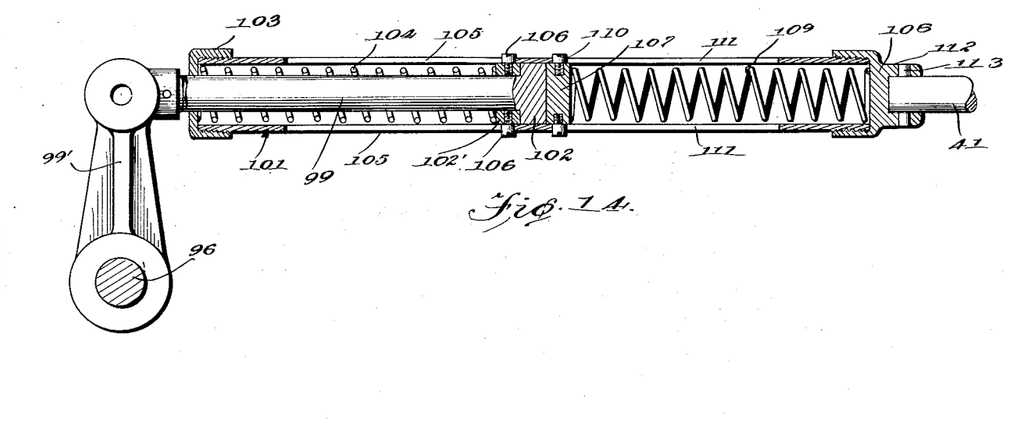
Figure 14 is a detail sectional view of the connection intermediate the control lever and selector.

The lower end of the rod or shaft 88 carries a segmental or mutilated gear 94 which is adapted to mesh with a similar gear 95 carried upon a shaft 96 journaled at its one end upon the steering column 75 as at 96' and at its other end to the frame of the associated vehicle as at 97. The last named end of the shaft 96 carries a crank arm 98 and the free end of this arm has pivotally attached thereto a rod or shaft 99 as at 100. Referring to Figure 14 it will be seen that the shaft 99 extends within a tubular member 101 and terminates in a head 102. Adjacent this head there is loosely fitted upon the shaft 99 a collar 102'.

The tubular member 101 has threaded upon its end associated with the crank arm 99' a cap 103 through which the shaft or rod 99 extends and interposed between the cap 103 and the collar 102' is a compression spring 104. The tubular member 101 has provided therein a pair of longitudinally alined slots 105 and the collar 102' carries a pair of set screws 106 adapted to slide within these slots 105. Forward to the head 102 of the shaft 99 there is fitted within the tubular member 101 a second head 107 and interposed between this head and the cap 108 forming a closure for the other end of the tubular member 101 is a coil spring 109. The head 107 carries a pair of set screws 110 which are adapted to slide within diametrically opposed and longitudinally extending slots 111. The slots 111 and the slots 105 should be in each instance equal in length to the distance the selector arm 34 may move upon the shaft S; the purpose of this arrangement will become clear when the operation of the device is fully described.

The cap 108 is formed with a boss 112 and it is provided with a suitable opening adapted to receive the outer end of the shifter rod 41, said rod being secured in the boss 112 by means of a pin 113.

Figure 2:
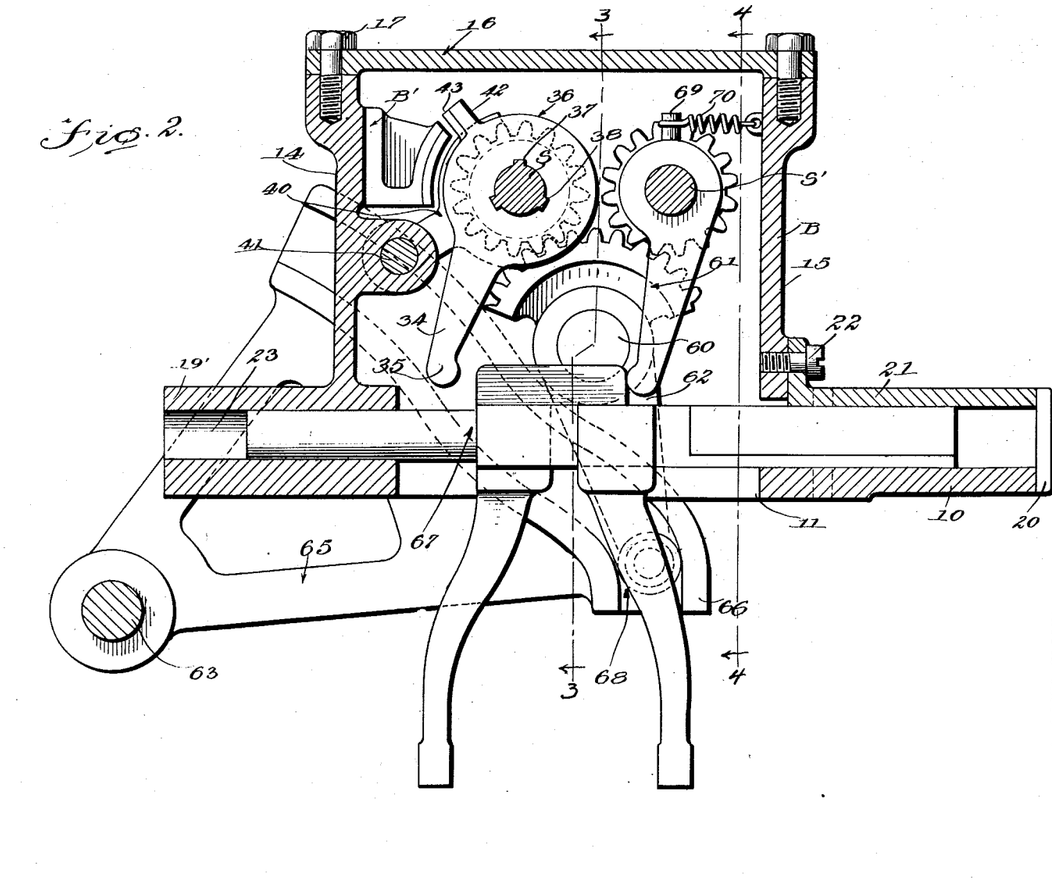
Figure 2 is a central longitudinal vertical sectional view of the gear shifting mechanism.
Figure 3:
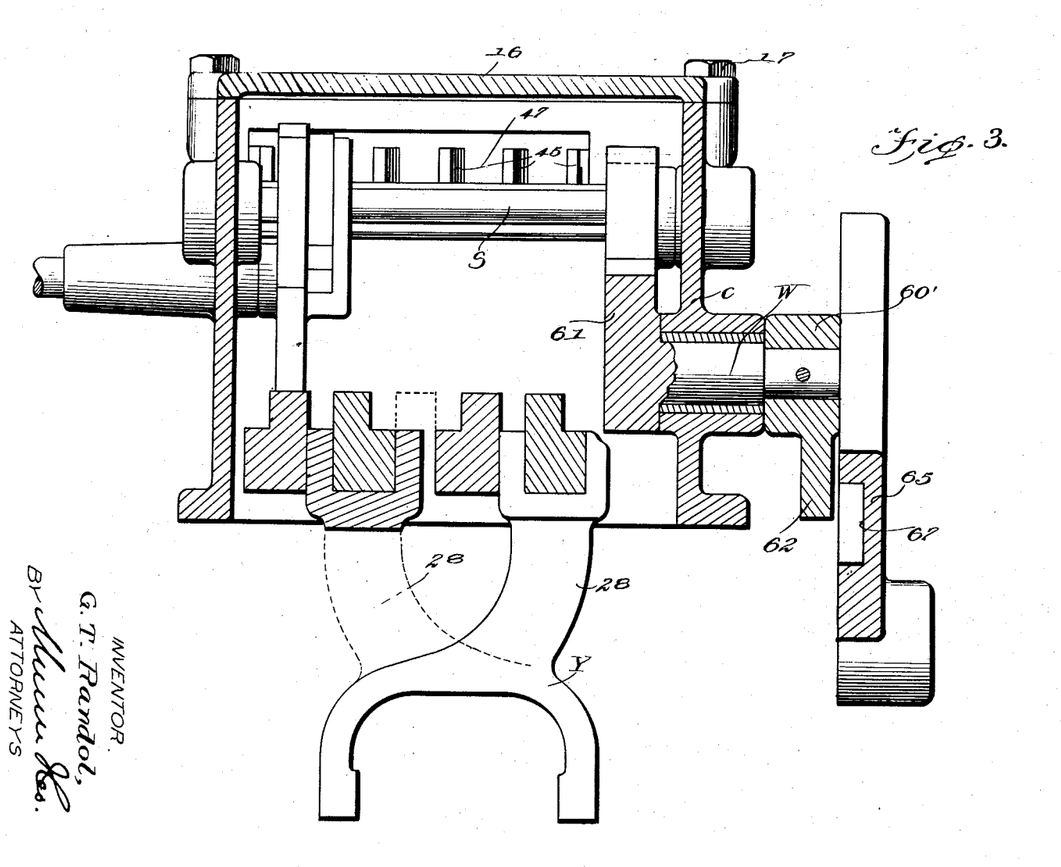
Figure 3 is a transverse vertical sectional view taken substantially on the lines 3—3 of Figure 2 and looking in the direction of the arrows.
Figures 4, 15:
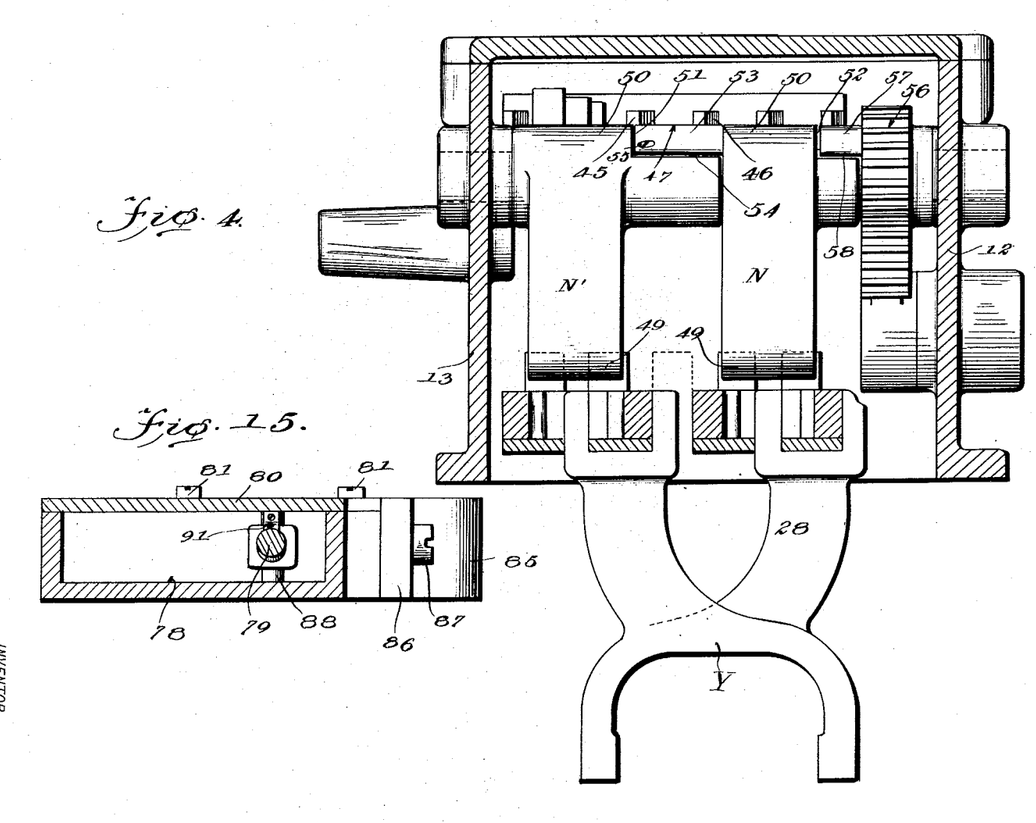
Figure 4 is a view similar to Figure 3 taken substantially on the line 4—4 of Figure 2 and looking in the direction of the arrows.
Figure 15 is a sectional view taken substantially on the line 15—15 of Figure 11.

In order that a gear of the transmission unit of the vehicle with which the present gear shifting mechanism may be associated may be shifted to its operating position it must be borne in mind that the selector arm 34 should assume a position for engaging the lug or protrusion 31 of the shifter rod connected with the gear it is desired to shift in the transmission casing; that the selector arm 34 must have its lug or detent 42 free to permit the shifter to move upon the shaft S; that the shaft S must be rotated a degree sufficient to move the shifter bar to its proper position and that the neutralizing arm N engaged by the lug or protrusion 31 must move to permit the movement of this shifter rod. These different operations are carried out in the following manner; assuming that the pedal 64 is in its dotted line position shown in Figure 10 and that the clutch K is disengaged, then the roller 63 carried by the arm 62 has assumed the position illustrated in Figure 2 of the drawings, that is this roller is positioned in the greatest throw of the groove 67. At this time the lug or detent 42 of the selector 34 is clear of the teeth of the lugs 45 of the guide bar B' and the selector arm may be moved upon the shaft S. Also it will be noted that the gaps 54 occurring at the rear side of the block 53 and the gear wheel hub extension 57 will be closed as shown in Figure 4 of the drawings. Assuming that the hand lever 89 is now brought so that the same is disposed in the slot 93 marked R and in doing this the crank shaft 99' carried at the rear end of the shaft 96 is operated in an obvious manner for drawing the shaft or rod 99 outwardly with respect to the casing 101 and against the compression of the spring 104. This movement will also move the tubular member 101 and in turn draw upon the shifter rod 41 which will draw the selector arm 34 to one of its extreme positions. This position will be as illustrated in Figure 3 of the drawings and the selector arm 34 will be in alinement with the lug 31 carried by the shifter rod R'. The shifter rod R' as heretofore referred to is adapted upon rear movement a predetermined degree to shift a certain gear within the associated gear casing for obtaining reverse drive. Upon the pedal 64 being released so that the clutch K may be engaged then the member 65 will move to its full right position shown in Figure 10 and during this movement the roller 63 carried upon the lower end of the arm 62 will also assume a position in the slot or groove 67 whereby to cause a clockwise movement of the segmental gear 61 which in turn will rotate each of the gears 56 and 59 in an anticlockwise direction and by this movement of the last named gears the selector arm 34 is swung rearwardly and thereby to engage the lug or protrusion 31 with which the same is in alinement and shift the rod R' rearwardly for making its proper engagement with the transmission gear. With the turning of the gear 56 the shaft S' will be rotated carrying along with it block 53; also the extension 57 which is integral with gear 56. The neutralizing member N' will be swung rearwardly by action of the selector against the opposite end of the protrusion 31. This movement will allow the gap between the block 53 and recess cut in member N' to remain closed throughout this movement, while the gap between the recess of member N and extension 57 will be open as shown in Figure 9 and neutralizing member N will retain the position shown in Figure 2 and member N will hold firmly its pair of gear shifting rods R⁴ and R³ in neutral position as this side is not active. Therefore it is seen that the neutralizing members N' and N act independent of the other and their being operated depends on their being swung rearwardly by means of the selector arm 34 operating against any one of the protrusions extending from any of the four gear shifting rods. The spring 70 is used for the purpose of holding the members from playing around idly and also to keep the gear shifting rods in neutral position when either of the neutralizing members N' or N is not active. The forward gap as shown in Figure 9 counts for nothing and the mechanical operation of the members N' and N depend solely for their operation upon the rear gap being closed. The shifter rod R' has in effect moved the proper gear in the gear transmission for obtaining reverse drive previous to the moment when the clutch K is engaged and thus any destruction to the transmission gear is obviated.

Assuming that the operator wishes to obtain high speed, and that the reverse speed is active as shown in the previous paragraph. With reverse speed active as stated the position of the several parts is as follows: Clutch pedal and cam 65 are in the position indicated by the solid lines, selector 34 is rocked rearwardly against protrusion 31 of shifter rod R', neutral member N' is rocked rearwardly and block 53 is against the offset confronting same ready on release of the clutch to bring reverse gear to neutral position prior to the shifting of the next selected gear which will be high speed, neutral member N is positioned as shown in Figure 2 and Figure 9, and the extension 57 is positioned as the block 53 is shown in Figure 9, that is the gap 54 is not closed between the extension 57 and offset from neutral member N. Now, the hand lever 89 is moved to slot 93 marked H and during this movement the crank arm 99' is moved to draw upon the rod or shaft 99. The shaft 99 is drawn against the tension of the spring 104 and sufficient energy is here stored so that upon the lug or detent 42 of the selector arm 34 becoming free from the guide bar B' the selector arm will be moved to the proper position. With the movement of the hand lever to the position mentioned, that is the slot 93 marked H, the operator will proceed with depressing the foot lever 64 and bring same to its dotted position shown in Figure 10 whereupon the roller 63 is brought to the position shown in Figure 3 and the detent 42 is free and the neutral member N' has moved reverse speed into neutral position. However, it is to be understood that should the operator of the car wait until the detent 42 of the selector arm 34 is free from the guide bar B' before moving the hand lever to any position desired then in that event the movement of the hand lever will be direct on the selector arm 34 and the tubular member 101 will be moved the proper distance and no tension will be brought on the springs 104 and 109. The springs only serve the purpose of allowing the hand lever to be set while the detent 42 is held by the guide bar B'. The shifter arm 34 will now move to its other extreme position upon the shaft S and be in alinement with the protrusion or lug 31 formed upon the shifter rod R⁴. Now upon the operator releasing the foot pedal 64 and permitting the clutch K to engage again, the shafts S and S' will be rotated as herebefore described and the shifter rod R⁴ moved in the proper direction for engaging the proper transmission gears for obtaining high speeds. Also the neutralizing arm N will be operated to permit this movement of the rod R⁴.

While I have herein shown and described the preferred form of my invention I wish it to be understood that I am aware of the fact that the construction, combination and arrangement of parts may be changed by those skilled in the art without departing from the spirit of the invention as indicated by the appended claims.

What I claim is:

1. In combination with a vehicle having a gear shifting transmission unit, a gear shifting mechanism including in combination a shaft, a selector member rotatable and shiftable upon said shaft, means operable from the steering column of said vehicle whereby the selector member may be shifted to position for operating upon the different gears of said gear transmission, a foot pedal adapted to be utilized for rotating the selector in a predetermined direction, means whereby with the rotation of said selector the transmission gear selected will be moved into its operative position, a second shaft, an arm radially extending therefrom and rotatably supported by the shaft, means for urging said arm in one direction, and connecting means between the free end of said arm and the gears of said transmission unit whereby said gears are continuously urged toward their neutral position.

2. In combination with a vehicle having a gear shifting transmission unit, a gear shifting mechanism including in combination a shaft, a selector member rotatable and shiftable upon said shaft, means operable from the steering column of said vehicle whereby the selector member may be shifted to position for operating upon the different gears of said gear transmission, a foot pedal adapted to be utilized for rotating the selector in a predetermined direction, means whereby with the rotation of said selector the transmission gear selected will be moved into its operative position, a second shaft, an arm radially extending therefrom and rotatably supported by the shaft, and a spring adapted to urge the arm in one direction, and connecting means between the free end of said arm and the gears of said transmission unit whereby said gears are continuously urged toward their neutral position.

3. In a gear shifting mechanism, a shaft, a selector member movable longitudinally upon said shaft, means whereby the selector member may be brought into operative relation with each gear of said transmission, means whereby with the rotation of said selector member a predetermined degree the gear selected will be brought into its operative position, a detent carried by said selector member, and stationary guideways adapted to co-operate with said detent for locking the selector member against longitudinal movement upon said shaft when said selector is rotated to bring a gear into its operative position.

4. In a gear shifting mechanism, a shaft, a selector carried by said shaft and movable longitudinally thereof, a plurality of gear shifting members, said members being each movable for shifting a gear into its operative position, spring means whereby the shifting members will be maintained in their neutral positions with respect to the gears of the gear transmission, a finger carried by the selector member adapted to be brought into operative relation with each of said shifter members with the longitudinal movement of said selector upon the shaft therefor, and means whereby the selector may be rotated for operating the selected shifter member.

5. In a gear shifting mechanism, a pair of rotatably supported shafts, gear means whereby said shafts may be rotated simultaneously and in a similar direction, and means carried by said shafts whereby a gear of the gear transmission may be brought into its operative position when said shafts are rotated in one direction and returned to its neutral position when said shafts are rotated in the opposite direction.

6. In a gear shifting mechanism, a pair of rotatably supported shafts, gear means whereby said shafts may be rotated simultaneously and in a similar direction, a finger extending radially from each of said shafts, a gear shifting member disposed between said fingers and adapted to be shifted or moved with the rotation of said shafts in either direction.

7. In a gear shifting mechanism, a pair of rotatably supported shafts, a gear wheel carried by each shaft, a third gear wheel in mesh with the gear wheels of said shafts, whereby with the rotation of said third gear wheel the shafts will be rotated simultaneously and in a similar direction, a finger extending radially from each shaft, a gear shifter element disposed between said fingers and adapted to be moved by said fingers upon the rotation of said shafts in either direction.

8. In a gear shifting mechanism, a pair of rotatably supported shafts, a gear carried by each of said shafts, a rotatable segmental gear in constant mesh with the gears carried by said shafts, a lever extending from said segmental gear whereby the same may be rotated, a finger extending from each of said shafts, a transmission gear shifter disposed between the free ends of said fingers and adapted to be moved with the rotation of said shafts in either direction.

9. In a gear shifting mechanism, a pair of rotatably supported shafts, a gear carried by each of said shafts, a gear wheel rotatably supported and adapted to mesh with each of the gears of said shaft, whereby the shafts may be rotated simultaneously and in a similar direction, an arm extending radially from the last-named gear wheel, a cam member supported for rotative movement, engaging means between said cam member and the arm of said gear wheel whereby the gear wheel may be rotated in either direction, a finger extending from each of the shafts, a transmission gear shifter disposed between the free ends of said fingers and adapted to be operated upon rotation of said shafts in either direction.

10. In a transmission gear shifting mechanism, a pair of rockable members, connecting means between said members whereby movement thereof must occur in a similar direction, and means whereby with rocking movement in one direction of said members a transmission gear will be moved to its operative position and movement of said members in the opposite direction will restore said gear to its original or neutral position.

11. In a transmission gear shifting apparatus of the character described, a plurality of shiftable members each adapted to be connected to a gear of the transmission and utilized for shifting said gear into either its operative or neutral position, an oscillatory arm, means whereby the arm may be moved so that the free end of the same is in engaging position with one of the shiftable members, means for swinging the arm to move the shiftable member to bring the transmission gear controlled thereby into its operative position, and means for constantly urging the gear to return to its neutral position.

12. In a transmission gear shifting apparatus of the character described, a plurality of shiftable members each adapted to be connected to a gear of the transmission and utilized for shifting said gear into either its operative or neutral position, an oscillatory arm, means whereby the arm may be moved so that the free end of the same is in engaging position with one of the shiftable members, means for swinging the arm to move the shiftable member to bring the transmission gear controlled thereby into its operative position, a second oscillatory arm, and means connected to said arm adapted to cause the same to swing for engaging the shiftable member and urging the member to its nonoperative position.

13. In a gear shifting mechanism, a shaft, a selector member movable longitudinally upon said shaft, means whereby the selector member may be brought into operative relation with each gear of said transmission, means whereby with the rotation of said selector member a certain degree, the gear selected will be brought into its operative position and the selector member locked against longitudinal movement upon said shaft, and spring-pressed means whereby upon the selector being returned to its operative position with relation to the transmission gear, said transmission gear will be automatically returned to its neutral or inoperative position.

GLENN T. RANDOL.